United States Patent
Cunningham et al.

(10) Patent No.: US 7,607,706 B2
(45) Date of Patent: Oct. 27, 2009

(54) FOLDING PIZZA PEEL

(75) Inventors: Chris Cunningham, Chicago, IL (US); Paul Christman, Wood Dale, IL (US)

(73) Assignee: Wilton Industries, Inc., Woodridge, IL (US)

( * ) Notice: Subject to any disclaimer, the term of this patent is extended or adjusted under 35 U.S.C. 154(b) by 0 days.

(21) Appl. No.: 11/712,148

(22) Filed: Feb. 28, 2007

(65) Prior Publication Data
US 2008/0203746 A1 Aug. 28, 2008

(51) Int. Cl.
*A47J 43/28* (2006.01)

(52) U.S. Cl. .......................................... 294/7

(58) Field of Classification Search .............. 294/7, 294/49; D7/644, 692; 30/142; 15/172
See application file for complete search history.

(56) References Cited
U.S. PATENT DOCUMENTS

| | | | | |
|---|---|---|---|---|
| 1,602,642 A | * | 10/1926 | Brathwaite | 30/142 |
| 1,803,006 A | * | 4/1931 | Davis | D7/692 |
| 2,485,521 A | * | 10/1949 | Wendt | 294/7 |
| 2,589,753 A | * | 3/1952 | Vinson | 30/142 |
| 2,613,977 A | | 10/1952 | Kellogg | |
| D337,032 S | | 7/1993 | Galati | |
| 5,440,811 A | * | 8/1995 | Challis | 30/169 |
| D411,080 S | * | 6/1999 | Santini | D7/644 |
| 6,530,611 B2 | | 3/2003 | Moreth | |
| D503,316 S | | 3/2005 | Webb et al. | |
| 7,380,848 B2 | * | 6/2008 | Petruzelli | 294/54.5 |
| 2004/0040108 A1 | * | 3/2004 | Kaminstein et al. | 15/172 |
| 2006/0130336 A1 | * | 6/2006 | Christensen et al. | 30/142 |

* cited by examiner

*Primary Examiner*—Paul T Chin
(74) *Attorney, Agent, or Firm*—McGuire Woods LLP

(57) ABSTRACT

A pizza peel features a blade and a handle that are pivotally-connected by a fastening arrangement featuring a knob. The handle may be moved between a storage position and a deployed position and may be locked in the selected position by manipulation of the knob. When the handle is in the stored position, the pizza peel may be easily stored.

22 Claims, 3 Drawing Sheets

FOLDING PIZZA PEEL

FIELD OF THE INVENTION

The present invention relates generally to pizza peels of the type used to insert and remove pizzas from ovens and, more particularly, to a pizza peel with a handle that can be folded or collapsed for ease of storage.

BACKGROUND OF THE INVENTION

Pizza peels used at pizza restaurants have long been known in the art. The basic design of a pizza peel includes a peel blade, usually made of metal, attached to a handle, usually made of wood so as to provide insulation. The pizza cook uses the peel blade to transfer the uncooked pizza into the pizza oven deeper than he would be able to using his hands alone. Also, the pizza peel allows the pizza cook to transfer the pizza to the oven without losing the shape of the pizza, whether it be round or square, which is an issue due to the flimsy nature of an uncooked pizza.

Pizza peels have traditionally been used in restaurants where storage of such cooking tools is not a significant issue. There has been an increasing interest among consumers, however, in performing restaurant style cooking at home. With more pizza peels being used in the home, storage has become an issue because a home kitchen usually has less storage space than a restaurant kitchen.

As a result, a need exists for a pizza peel that can be easily stored away. Furthermore, it would be desirable for a pizza peel to have a handle that is collapsible or foldable, thereby having the benefit of both a handle and storability.

DETAILED DESCRIPTION OF EMBODIMENTS

Figure 1:
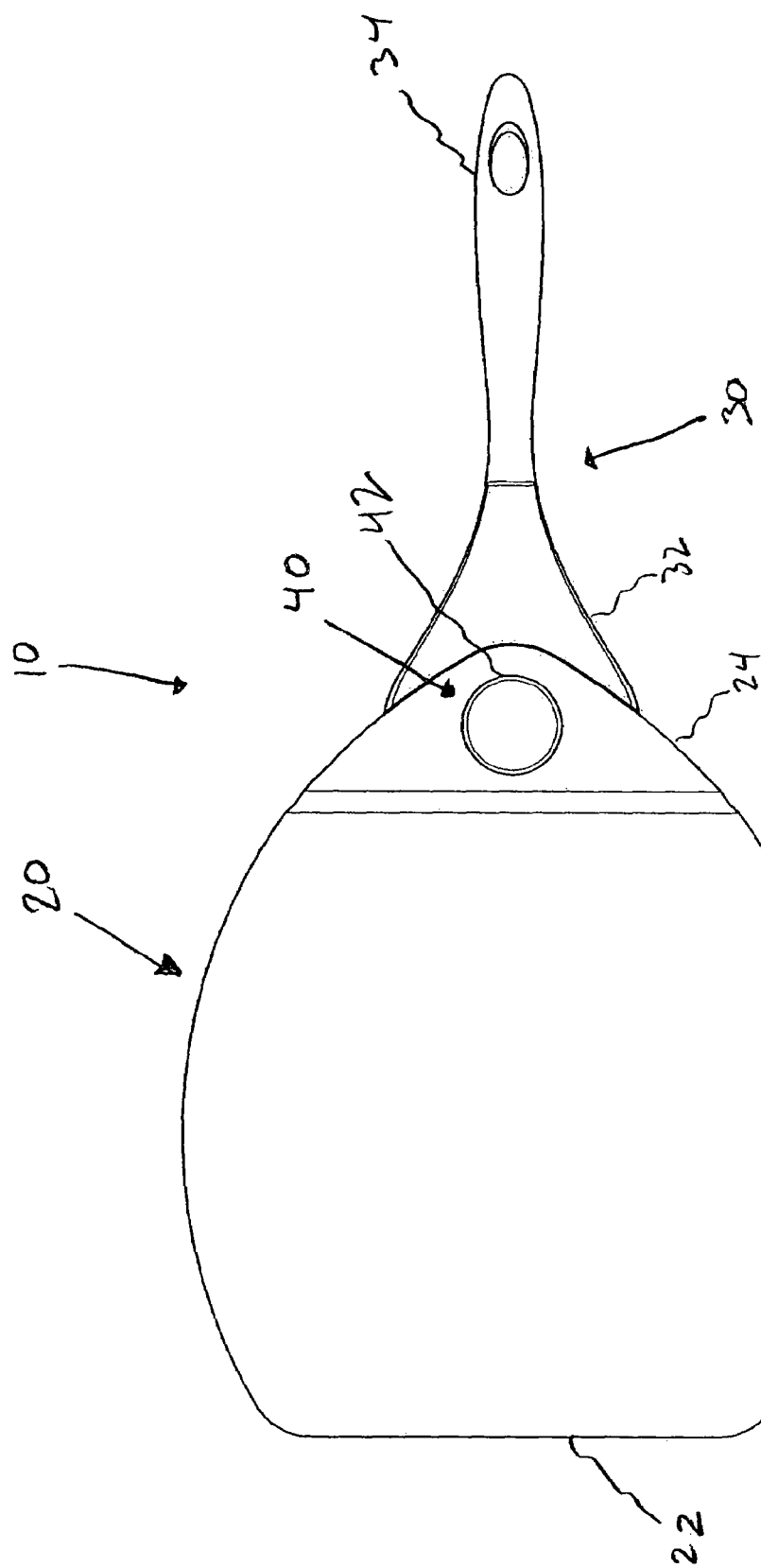
FIG. 1 is a top plan view an embodiment of the folding pizza peel of the present invention with the handle in the deployed position.

An embodiment of the folding pizza peel of the present invention is indicated in general at 10 in FIG. 1. The pizza peel 10 includes a blade, indicated in general at 20, a handle, indicated in general at 30, and a knob, indicated in general at 40. FIG. 1 illustrates the handle in the deployed position so that the pizza peel may be used to insert a pizza into an oven, shift the pizza within the oven and retrieve a pizza from the oven. As will be described in greater detail below, the handle may be pivoted with respect to the blade so that the pizza peel may be placed in a compact storage configuration. While the invention is described in terms of use for baking pizzas, it is to be understood that it could be sized and used to prepare other types of baked goods.

The handle preferably is constructed of wood, although other materials featuring temperature insulation capabilities, such as plastic, may be used. The blade is preferably constructed of aluminum, or another type of metal, although other materials capable of withstanding oven temperatures may be used.

Figure 2:
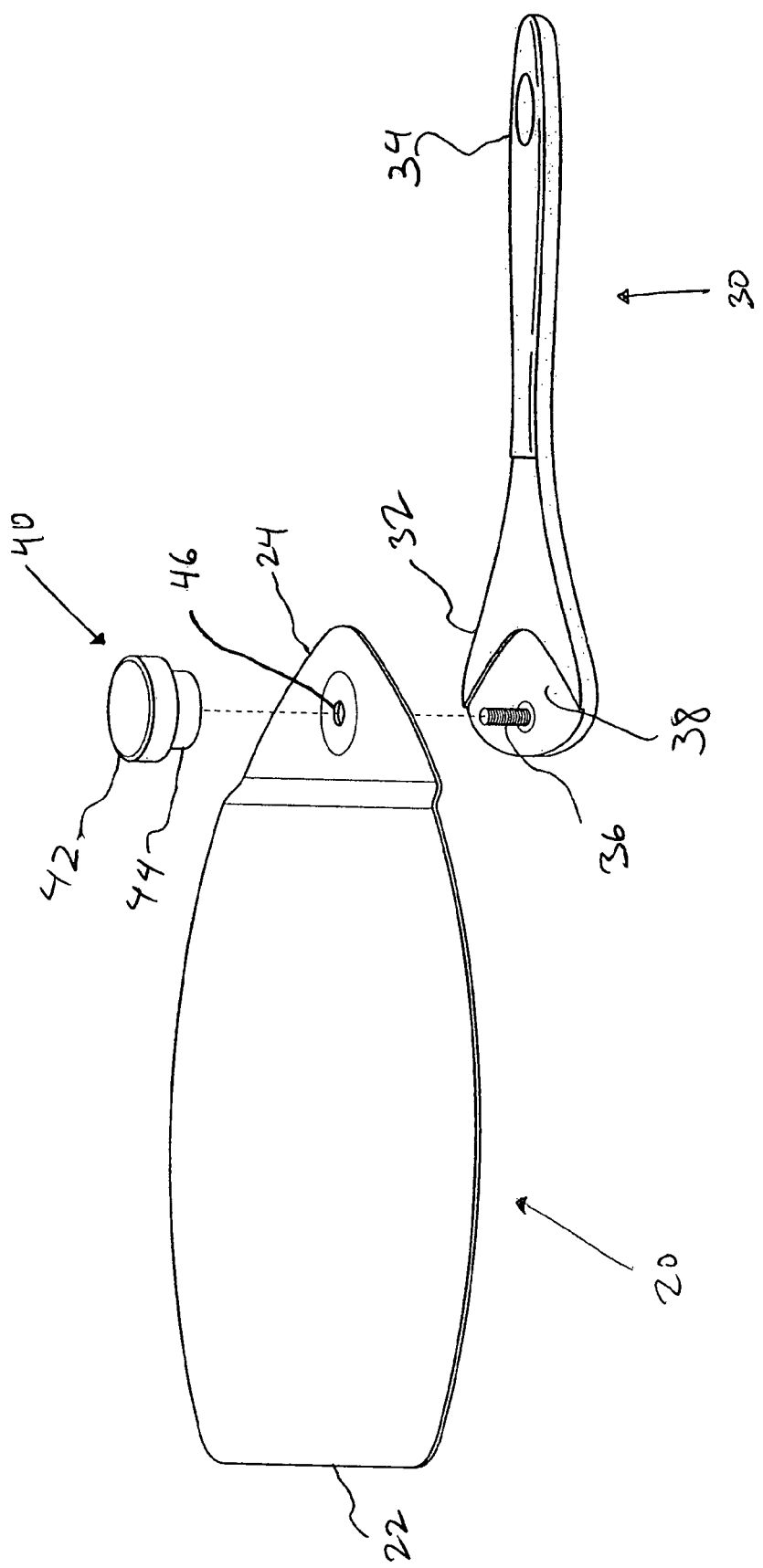
FIG. 2 is an exploded top perspective view of the folding pizza peel of FIG. 1.

As illustrated in FIGS. 1 and 2, the blade 20 has a blade edge 22 and a mounting portion 24. The handle 30 has a blade mounting end 32 and a grip end 34.

As illustrated in FIG. 2, the mounting portion 24 of the blade is affixed to the blade mounting end 32 of the handle by a bolt 36 protruding from the blade mounting end 32 of the handle that is engaged by the knob 40. More specifically, the knob 40 has an upper cap portion 42 and a lower portion 44 that features a reduced diameter and a threaded bore on its underside. The threaded bore receives the bolt 36 so that the knob 40 is capable of being tightened or loosened with respect to bolt 36. Both the blade mounting end 32 of the handle and the mounting portion 24 of the blade features openings (illustrated at 46 for the blade in FIG. 2) through which the bolt 36 passes.

The mounting portion 24 of the blade features an arc-shaped edge and rests in an indentation 38 on the blade mounting end 32 of the handle that features a corresponding shape. As a result, the handle is locked in the deployed position illustrated in FIG. 1 (and in phantom in FIG. 3) when the knob 40 is rotated so that it tightens with respect to bolt 36 with the mounting portion of the blade sandwiched between the knob lower portion 44 and the blade mounting end 32 of the handle.

Figure 3:
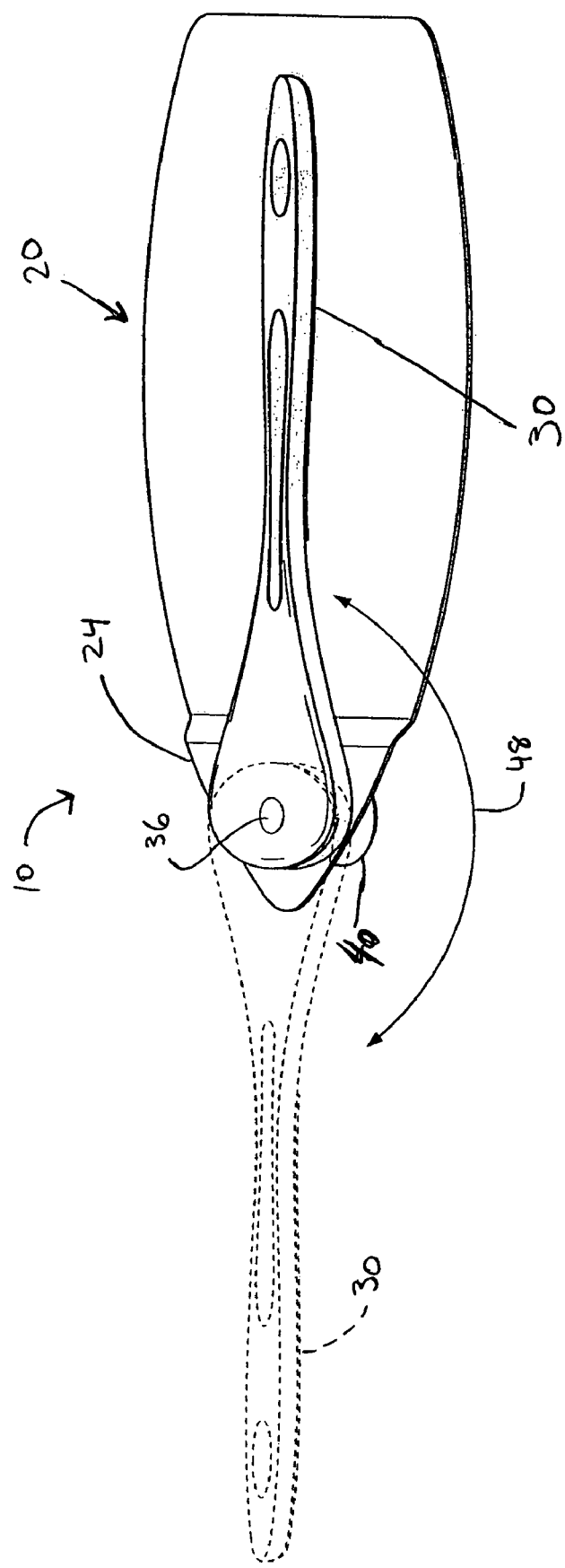
FIG. 3 is a bottom perspective view of the folding pizza peel of FIGS. 1 and 2 with the handle in the storage position and with the handle deployed position illustrated in phantom.

FIG. 3 illustrates the pizza peel 10 with the handle 30 in the storage position. Such a folded configuration provides the pizza peel with compact dimensions for ease of storage. To place the handle in the deployed position, indicated in phantom in FIG. 3, the knob 40 is rotated so that it is loosened with respect to bolt 36. The mounting portion 24 of the blade can then slide along the axis of the bolt to a position where the mounting portion 24 of the blade is no longer resting in the indentation 38 (FIG. 2) of the blade mounting end 32 of the handle. The handle can then be, as indicated by arrow 48, pivoted 180 degrees around the axis defined by bolt 36 to the deployed position indicated in phantom. The knob 40 is then rotated so as to lock the handle in the deployed position.

While a knob and bolt are illustrated in the embodiment of the pizza peel of FIGS. 1-3, alternative fasteners known in the art could be used to secure the handle to the blade in a pivoting fashion.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

What is claimed is:

1. A pizza peel comprising:
   a handle having a blade mounting end and a grip end, the handle having a longitudinal axis that extends from the blade mounting end to the grip end;
   a blade having a mounting portion and a blade edge configured to support a pizza wherein the mounting portion and the blade edge are configured to lie in different planes;
   a bolt engaging the blade mounting end of the handle and the mounting portion of the blade, the bolt having a longitudinal axis that is generally perpendicular to a plane of the blade edge and perpendicular to the longitudinal axis of the handle;
   a knob configured to be gripped by a user's hand and engaging the bolt so that the blade mounting end of the handle is secured to the mounting portion of the blade, wherein the handle is configured to rotate about 180 degrees between a deployed position, wherein the grip end extends away from the blade edge, and a storage position, wherein the grip end is adjacent to the blade edge, further wherein the handle may be locked in a selected position by tightening the knob with respect to the bolt; and the mounting end of the handle comprises an indentation that is configured to receive the mounting portion of the blade when the handle is in the deployed position.

2. The pizza peel of claim 1 wherein the mounting portion of the blade comprises an arc-shaped edge that is configured to be received into the indentation.

3. The pizza peel of claim 2, wherein the indentation has a shape that is complementary to the arc-shaped edge of the mounting portion of the blade.

4. The pizza peel of claim 3, wherein the indentation is configured to prevent rotation of the blade.

5. The pizza peel of claim 1 wherein the handle is made of wood.

6. The pizza peel of claim 1 wherein the blade is made of metal.

7. The pizza peel of claim 1 wherein the bolt passes through openings formed in the blade mounting end of the handle and the mounting portion of the blade.

8. The pizza peel of claim 1 wherein the knob includes an upper cap portion and a lower portion that features a reduced diameter and a threaded bore that receives said bolt.

9. The pizza peel of claim 1, wherein the indentation is configured to have a shape that is complementary to the mounting portion of the blade so that the indentation engages the mounting portion and prevents rotation therebetween.

10. The pizza peel of claim 9, wherein the indentation is configured to prevent rotation of the blade.

11. The pizza peel of claim 1, wherein the mounting portion of the blade and the blade edge are connected by a bent portion so that the mounting portion of the blade and the blade edge are arranged to lie in different parallel planes.

12. A pizza peel comprising:

a handle having a blade mounting end and a grip end having a longitudinal axis that extends from the blade mounting end to the grip end;

a blade having a mounting portion and a blade edge, the blade sized and configured to support a pizza and wherein the mounting portion of the blade and the blade edge are connected with a bent portion such the mounting portion and the blade edge lie in different planes;

a mechanical fastener engaging the blade mounting end of the handle and the mounting portion of the blade, the mechanical fastener having a longitudinal axis that is generally perpendicular to a plane of the blade edge and the longitudinal axis of the handle;

a knob engaging the mechanical fastener so that the blade mounting end of the handle is secured to the mounting portion of the blade, wherein the handle is configured to rotate about 180 degrees between a deployed position and a storage position, wherein the grip end is adjacent to the blade edge, further wherein the handle may be locked in a selected position by tightening the knob with respect to the mechanical fastener; and the mounting end of the handle comprises an indentation that receives the mounting portion of the blade when the handle is in the deployed position.

13. The pizza peel of claim 12 wherein the mounting portion of the blade comprises an arc-shaped edge.

14. The pizza peel of claim 12 wherein the handle is made of wood.

15. The pizza peel of claim 12 wherein the blade is made of metal.

16. The pizza peel of claim 12 wherein the mechanical fastener passes through openings formed in the blade mounting end of the handle and the mounting portion of the blade.

17. The pizza peel of claim 12 wherein the knob includes an upper cap portion and a lower portion that features a reduced diameter and a threaded bore that receives said mechanical fastener.

18. The pizza peel of claim 12, wherein the indentation has a shape that is complementary to the mounting portion of the blade.

19. The pizza peel of claim 12, wherein the indentation has a shape that is complementary to the arc-shaped edge of the mounting portion of the blade.

20. The pizza peel of claim 19, wherein the indentation is configured to prevent rotation of the blade.

21. The pizza peel of claim 20, wherein the indentation is configured to prevent rotation of the blade.

22. The pizza peel of claim 12, wherein the mounting portion of the blade and the blade edge lie in different planes.

* * * * *